Patented May 26, 1936

2,041,814

UNITED STATES PATENT OFFICE 2,041,814

PROCESS FOR MAKING VINYL CHLORIDE

Samuel L. Brous, Akron, Ohio, assignor to The B. F. Goodrich Company, New York, N. Y., a corporation of New York No Drawing. Application August 28, 1935, Serial No. 38,262

4 Claims. (Cl. 260—165)

This invention relates to the manufacture of vinyl chloride and has as its object the preparation of vinyl chloride by an improved process involving a low cost and giving high yields.

Vinyl chloride has heretofore been made, along with acetylene as a by-product, by heating ethylene dichloride with alcoholic potash. This method does not give satisfactory yields and is not suitable for large scale operations, for large volumes of alcohol are required, of which considerable quantities are unavoidably lost, and because the salt formed as a by-product is insoluble in the reaction medium and tends to cake in the bottom of the reaction vessel, causing difficulties in heat transfer and in cleaning the vessel after the reaction. On the other hand, if aqueous caustic solutions are used, the reaction is quite slow unless temperatures well over 100° C. are employed, in which case pressure vessels are required. The use of pressure vessels in this reaction is particularly undesirable, for one of the products is a gas, which, if confined, further increases the pressure and makes it necessary to employ very heavy, expensive equipment.

I have discovered that ethylene dichloride can be converted to vinyl chloride at atmospheric pressure in a reasonable time and with excellent yields by treating it with concentrated aqueous caustic in the presence of a moderate quantity of an alcohol and particularly of methanol.

Three different products can be obtained by the reaction of ethylene dichloride with caustic alkali. In the presence of a large quantity of water the chlorine is removed by hydrolysis, giving ethylene glycol. In the presence of strong caustic, hydrogen chloride is removed, giving vinyl chloride, and if the caustic is present in excess two molecules of hydrogen chloride are removed, giving acetylene. I prefer to carry out the reaction in the presence of small quantities of both water and alcohol, and to introduce the caustic only as fast as it is used up in the reaction, as I have found that under these conditions appreciable quantities of glycol and of acetylene are not formed but that maximum yields of vinyl chloride are formed in accordance with the desired reaction:

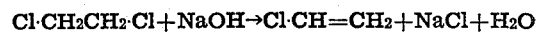

Sodium hydroxide itself is insoluble in ethylene dichloride, as is the concentrated water solution of sodium hydroxide which is now the cheapest and most convenient commercial form of this chemical. However, both sodium hydroxide and ethylene dichloride are readily soluble in alcohol, hence are readily brought into the intimate contact which is required for a reasonably rapid reaction. A considerable quantity of water may be present without any separation of phases taking place, but even when a separation does occur, sufficient alcohol is retained in the ethylene dichloride phase to dissolve the sodium hydroxide and bring it into reaction. The salt formed during the reaction dissolves in the water phase as soon as it makes its appearance, forming a saturated brine usually containing an excess of undissolved salt. Because of the "salting out" effect the alcohol and sodium hydroxide tend to be driven from the aqueous phase over to the ethylene dichloride where they are wanted. Although any of the volatile, water-soluble alcohols may be used, such as methanol, ethanol or iso-propanol, it is preferred to use methanol, as it most readily dissolves the caustic, and in addition is most readily separated from the water, along with any ethylene dichloride remaining at the end of the reaction.

The quantity of inert or solvent liquids should be kept low, not only for the practical purpose of keeping the size of the reaction vessel within convenient bounds, but for the further purpose of avoiding the formation of by-products. As is intimated above, an excessive quantity of water promotes hydrolysis. The quantity which will just dissolve the caustic is convenient since caustic soda is most economically purchased as a concentrated solution, and no advantage is gained by adding more water. The presence of a large quantity of alcohol tends to retain the reactants in a single phase, but on the other hand dilutes them. Furthermore, vinyl chloride is soluble in alcohol, hence if the proportion of alcohol is too large, the vinyl chloride will be retained in solution to some extent and will react further with the caustic to produce acetylene, with a corresponding reduction in yield. This is especially true if too much caustic is present at any time. It is preferred to keep the quantity of alcohol smaller than that of the ethylene dichloride initially present.

Since the formation of acetylene is promoted by the presence of an excess of caustic, it is preferred to add the caustic progressively as it is needed. From a practical operating point of view, this is also very desirable, for the reaction is exothermic and if too much caustic is present the reaction may be difficult to control especially in large batches.

The reaction in its preferred form is therefore carried out by mixing ethylene dichloride with a fraction of its weight of methanol in a vessel equipped with a reflux condenser and stirrer, warming until the liquid refluxes gently, then introducing slowly a concentrated aqueous caustic solution.

The vinyl chloride formed is a gas and distils off continuously during the reaction. When the evolution of vinyl chloride has ceased, there will remain, in addition to the salt and brine, the alcohol and small quantities of unreacted ethylene dichloride and sodium hydroxide. The alcohol and ethylene dichloride are readily recovered by distillation of the residue. If methanol is used, it readily distils from the brine almost free from water, followed by the ethylene dichloride. These recovered materials may be returned together to the next batch, or if preferred may be separated and reused separately. The slurry of salt brine and unreacted sodium hydroxide can then be dumped, leaving the reaction vessel clean and ready for a new batch.

As a specific example of one embodiment of the process 100 parts by weight of ethylene dichloride are mixed with 32 parts of methanol in a kettle equipped with a water cooled reflux condenser, and a second refrigerated condenser to collect the vinyl chloride. The mixture is warmed until it refluxes, then 100 parts of 46% caustic soda solution are added at a constant rate over a period of eight to ten hours. Evolution of vinyl chloride commences soon after addition of the first portions of caustic and continues at a fairly uniform rate. After all the caustic is added, heating is continued for four or five hours, or until evolution of further vinyl chloride ceases. The vinyl chloride condenser is then disconnected and the water cooled condenser changed from reflux and the methanol and unreacted ethylene dichloride are distilled off and saved for use in subsequent batches. The residual brine is then dumped. If reasonably efficient condensers are used, the product will be very pure and the yield will approach the quantitative.

Under the conditions of this example the actual concentration of the caustic in the alcohol and water will never exceed 20%, and in fact will be in the neighborhood of 10% throughout the reaction. This is a concentration which causes the reaction to proceed smoothly and at a convenient and controllable rate. At the end of the reaction the quantity of unreacted caustic remaining is less than that equivalent to the unreacted ethylene dichloride, hence an excess of caustic is never present to cause the formation of acetylene.

It will be understood that the process may be modified to a considerable extent without departing from the spirit and scope of the invention as defined in the appended claims.

I claim:

1. The method of making vinyl chloride which comprises heating ethylene dichloride at atmospheric pressure, in the presence of both water and a volatile, water-soluble alcohol, with caustic soda, the quantity of caustic present being always less than that equivalent to the ethylene dichloride.

2. The method of making vinyl chloride which comprises heating ethylene dichloride at atmospheric pressure, in the presence of a volatile, water-soluble alcohol, and adding aqueous caustic soda solution at approximately the rate at which it enters into the reaction.

3. The method of making vinyl chloride which comprises heating ethylene dichloride at atmospheric pressure in the presence of methanol and adding aqueous caustic soda solution progressively to the mixture.

4. The method of making vinyl chloride which comprises heating a quantity of ethylene dichloride at atmospheric pressure with a smaller quantity of methanol, and adding aqueous caustic soda solution at approximately the rate at which it enters into the reaction, the quantity of caustic present being always less than that equivalent to the ethylene dichloride.

SAMUEL L. BROUS.